US012777532B2

(12) United States Patent
Montemurro et al.

(10) Patent No.: US 12,777,532 B2
(45) Date of Patent: Oct. 27, 2026

(54) SYSTEM AND METHODS FOR PROVIDING PRIORITY NETWORK ACCESS FOR A MULTI-LINK WLAN ENTITY

(71) Applicant: HUAWEI TECHNOLOGIES CO., LTD., Shenzhen (CN)

(72) Inventors: Michael Montemurro, Kanata (CA); Stephen Mccann, Kanata (CA); Arik Klein, Giva'at Shmu'el (IL)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 634 days.

(21) Appl. No.: 18/109,227

(22) Filed: Feb. 13, 2023

(65) Prior Publication Data

US 2023/0262786 A1 Aug. 17, 2023

Related U.S. Application Data

(60) Provisional application No. 63/310,349, filed on Feb. 15, 2022.

(51) Int. Cl.

*H04W 74/08* (2024.01)
*H04W 4/50* (2018.01)
*H04W 74/0833* (2024.01)
*H04W 84/12* (2009.01)

(52) U.S. Cl.

CPC ......... *H04W 74/0875* (2013.01); *H04W 4/50* (2018.02); *H04W 84/12* (2013.01)

(58) Field of Classification Search

CPC ... H04W 74/0875; H04W 4/50; H04W 84/12; H04W 76/15; H04W 4/90; H04W 76/50;

(Continued)

(56) References Cited

U.S. PATENT DOCUMENTS

2016/0112944 A1* 4/2016 Zhou ..................... H04W 48/16 370/338
2021/0360646 A1 11/2021 Chu et al.

(Continued)

FOREIGN PATENT DOCUMENTS

CN 101395949 A 3/2009
CN 106162918 A 11/2016
CN 107182105 A 9/2017

OTHER PUBLICATIONS

IEEE P802.11b/D1.3. Draft Standard for Information technology—Telecommunications and information exchange between systems Local and metropolitan area networks—Specific requirements. Part 11: Wireless LAN Medium Access Control (MAC) and Physical Layer (PHY) Specifications. Amendment 8: Enhancements for extremely high throughput (EHT), Working Group of the LAN/MAN Standards Committee of the IEEE Computer Society, New York, USA, Nov. 2021.

(Continued)

*Primary Examiner* — Joseph E Dean, Jr.

(57) ABSTRACT

A method for configuring services in a communications network including defining, by a service provider, a service type, then associating, by the service provider of the service type, the service type with an Enhanced Distributed Channel Access (EDCA)/Priority Access parameter set on an Access Point (AP) infrastructure. Then, provisioning a WLAN entity with the service type. In some cases, the WLAN entity is a multi-link device (MLD), and the service type is associated with a set of links of the WLAN entity.

17 Claims, 10 Drawing Sheets

| Invoking device | SME/MLME layer primitives MLME-NSEP PRI ACCESS ENABLE | | Frames NSEP Priority Access frame | |
|---|---|---|---|---|
| | 502, 506 Request / indication | 508, 512 Response / confirm | 504 request | 510 response |
| AP | • Service type<br>• EDCA parameter set | • Service type<br>• EDCA parameter set | • Service type<br>• EDCA parameter set | • Service type<br>• EDCA parameter set |
| Non-AP STA | • Service type | • Service type | • Service type | • Service type |
| AP MLD | • Service type<br>• EDCA parameter set<br>• Recommended / prohibited links | • Service type<br>• EDCA parameter set<br>• Recommended / prohibited links | • Service type<br>• EDCA parameter set<br>• Recommended / prohibited links | • Service type<br>• EDCA parameter set<br>• Recommended / prohibited links |
| Non-AP MLD | • Service type<br>• Recommended / prohibited links | • Service type<br>• Recommended / prohibited links | • Service type<br>• Recommended / prohibited links | • Service type<br>• Recommended / prohibited links |

(58) Field of Classification Search
CPC ............... H04W 74/085; H04W 12/06; H04W 74/0816
See application file for complete search history.

(56) References Cited

U.S. PATENT DOCUMENTS

| | | | | |
|---|---|---|---|---|
| 2022/0240264 | A1* | 7/2022 | Chu | H04W 12/06 |
| 2022/0353910 | A1* | 11/2022 | Lu | H04W 74/006 |
| 2022/0361193 | A1* | 11/2022 | Fang | H04W 4/90 |

OTHER PUBLICATIONS

Subir Das et al, "Proposed Comment Resolution (CC34) and Draft Text for NSEP Priority Access", IEEE P802.11 Wireless LANs, IEEE 802.11-21/0555r7, Mar. 29, 2021.
Yonggang Fang et al, "Resolution for CIDs related to 35.11.3.1 (CC 36)", IEEE P802.11 Wireless LANs, Apr. 10, 2021.
Yonggang Fang et al, "Resolution for CIDs related to 35.11.3.1 (CC 36)", Media TEK,IEEE 802.11-21/1317r2, Apr. 10, 2021, total 14 pages.
Liuming Lu et al, "Consideration on EDCA Operation for Restricted TWT", OPPO, IEEE 802.11-21/1913r3, Nov. 15, 2021, total 15 pages.
Yonggang Fang et al. Resolution for CIDs related to 35.11.3.1 (CC 36), IEEE P802.11Wireless LANs, IEEE 802.11-21/1317r1, Apr. 10, 2021, total 11 pages.
Binita Gupta et al. 802.11 WLAN and 3GPP 5G System Interworking, IEEE 802.11-20/1579r2, Tutorial at IEEE 802 Plenary, Oct. 2020, total 40 pages.

* cited by examiner

| Invoking device | SME/MLME layer primitives MLME-NSEP PRI ACCESS ENABLE | | Frames NSEP Priority Access frame | |
|---|---|---|---|---|
| | 502, 506 Request / indication | 508, 512 Response / confirm | 504 request | 510 response |
| AP | • Service type<br>• EDCA parameter set | • Service type<br>• EDCA parameter set | • Service type<br>• EDCA parameter set | • Service type<br>• EDCA parameter set |
| Non-AP STA | • Service type | • Service type | • Service type | • Service type |
| AP MLD | • Service type<br>• EDCA parameter set<br>• Recommended / prohibited links | • Service type<br>• EDCA parameter set<br>• Recommended / prohibited links | • Service type<br>• EDCA parameter set<br>• Recommended / prohibited links | • Service type<br>• EDCA parameter set<br>• Recommended / prohibited links |
| Non-AP MLD | • Service type<br>• Recommended / prohibited links | • Service type<br>• Recommended / prohibited links | • Service type<br>• Recommended / prohibited links | • Service type<br>• Recommended / prohibited links |

FIG. 5

SYSTEM AND METHODS FOR PROVIDING PRIORITY NETWORK ACCESS FOR A MULTI-LINK WLAN ENTITY

CROSS-REFERENCE TO RELATED APPLICATIONS

This application claims the benefit of priority to U.S. provisional Patent Application No. 63/310,349 filed on Feb. 15, 2022, entitled "SYSTEM AND METHODS FOR PROVIDING PRIORITY NETWORK ACCESS FOR A MULTI-LINK WLAN ENTITY", the contents of which are incorporated herein by reference in their entirety.

TECHNICAL FIELD

The present invention pertains to the field of wireless communications, and in particular to methods and systems for facilitating priority access to wireless network infrastructure for services corresponding to National Security and Emergency Preparedness (NSEP).

BACKGROUND

Wireless communications is used by almost all mobile and many fixed computing devices including cellular phones, tablets, laptop computers, consumer electronic devices, Internet-of-Things (IoT) devices, and other home appliances and the IEEE 802.11 family of standards (also known as WLAN) is commonly used to connect these devices with each other, to access the Internet, and otherwise communicate.

The IEEE 802.11's Extremely High Throughput (EHT) Task Group (TG) "be" has recently started standardization activities within the IEEE 802.11 WLAN project and the work of this TG is expected to be included in upcoming IEEE 802.11be standards. One of the new features of IEEE 802.11be is the creation of a Multi-Link Device (MLD). MLD refers to a wireless LAN (WLAN) entity or device that has multiple radio links to communicate with other MLD entities. A typical use case for multi-link operation (MLO) would be an Access Point (AP) connecting to a non-AP station (STA), such as WLAN terminal, computer, or a cellular phone, using at least 2 radio links, for example in the 2.4 GHz and 5 GHz WLAN bands, where the traffic is coordinated between the links and one security association is maintained across the two links.

The IEEE 802.11be standard also includes a new feature called NSEP (National Security and Emergency Preparedness) Priority Access, sometimes also referred to as Emergency Preparedness Communications Service (EPCS). NSEP Priority Access gives a wireless device preferential channel access for network communications resources relative to other network devices when traffic related to a priority service is transmitted or received. Currently, NSEP Priority Access is granted by a network operator to a device on the network through AP infrastructure for all services tagged as having NSEP Priority Access. A set of Enhanced Distributed Channel Access (EDCA) parameters is used to configure the NSEP priority access. Examples of NSEP priority service types include emergency voice services, real-time sensor feeds, video camera feeds, incident response systems, etc. Presently, once priority access is enabled all of these services are enabled for the device, and all of these priority services are configured using the same parameters.

This approach has several drawbacks. Presently, the NSEP priority access is established regardless of the specific service it should serve, even if only one service is to be used. Different NSEP services can benefit from service specific network traffic characteristics but customizing EDCA parameters for each service is not presently possible. Furthermore, when NSEP priority access is established between an AP MLD and a non-AP MLD, it applies for all the setup links of the MLD even through a service may not be suitable for all these links, but rather for only some of them. NSEP priority access cannot be enabled only on a specific subset of MLD links, nor can NSEP priority access be prohibited on a specific subset of links out of all setup links negotiated between the AP MLD and non-AP MLD when they establish connectivity.

Therefore, there exists a need to allow a service provider to enable and configure NSEP priority access for MLD entities that obviates or mitigates one or more deficiencies of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide methods and systems to allow a pair of devices, such as a non-AP STA and an AP, or a non-AP MLD and an MLD, to provide NSEP capability by managing and mapping their multiple radio resources to the requirements of the NSEP access. Embodiments enable the pair of devices to map different radio resources to different types of NSEP services, concurrently if required. Embodiments enable systems to authorize different services to different connected devices.

Embodiments enumerate different NSEP service types and associate each service type with a specific NSEP service. In the AP infrastructure, each NSEP service type may be associated with a corresponding parameter set or may be associated with either a preferred link set or a prohibited link set. Furthermore, in network Authentication, Authorisation and Accounting (AAA) infrastructure, one or more NSEP service types may be assigned to an AAA policy and the AAA policy may be used to define the NSEP priority access service types that are eligible for that associated non-AP STA or non-AP MLD. An AP MLD may assign links to map to a required NSEP service, and more than one link can be used to map to a single NSEP service. Also, more than one NSEP service can be mapped to a single link.

Embodiments may also be used for non-MLD (single-link devices) to configure NSEP services. Each NSEP service type may be associated with a corresponding parameter set used to configure the service between an AP and a non-AP STA.

Embodiments enable a mechanism to define separate services with their respective parameters and specification for specific links. Mechanisms are provided to modify the parameters concurrently during the service.

In accordance with embodiments of the present invention, there is provided a method for configuring services in a communications network. The method includes defining, by a service provider, a service type, and associating, by the service provider of the service type, the service type with an Enhanced Distributed Channel Access (EDCA)/Priority Access parameter set on an Access Point (AP) infrastructure. Then provisioning a Wireless Local Area network (WLAN) entity with the service type.

In further embodiments, the WLAN entity is a multi-link device (MLD) and the service type is associated with a set of links of the WLAN entity.

In further embodiments, the set of links includes a subset of links to be used for the service type.

In further embodiments, the set of links includes a subset of links that is prohibited to use for the service type.

In further embodiments, the associating of the service type with the EDCA/Priority Access parameter set is based on a traffic characteristic of the service type.

In further embodiments, the provisioning of the parameter set on the AP infrastructure is performed using Authentication, Authorization and Accounting (AAA) protocols.

In accordance with embodiments of the present invention, there is provided a method for configuring services in a communications network. The method includes sending, by a WLAN entity, an NSEP priority access frame, the frame including a service type of the service.

In further embodiments, the frame is either an NSEP priority access request or an NSEP priority access response frame.

In further embodiments, the NSEP priority access response frame is sent to modify the parameters of a previously established NSEP Service Operation.

In further embodiments, the WLAN entity is an access point (AP), and the frame further includes an EDCA or priority access parameter set to be used for the service type.

In further embodiments, the AP is an AP affiliated with an AP multi-link device (MLD), and the frame further includes a set of links of the service type.

In further embodiments, the WLAN entity is a non-AP STA is affiliated with a non-AP multi-link device (MLD), and the request frame further includes a set of links of the service type.

In further embodiments, the set of links includes a subset of links to be used for the service type.

In further embodiments, the set of links includes a subset of links that is prohibited to use for the service type.

In further embodiments, the links conform to a network policy received from a subscription service provider network.

In further embodiments, the sending of the NSEP priority access request frame is sent in response to the MAC layer receiving a request primitive from an SME layer of the WLAN entity.

In accordance with embodiments of the present invention, there is provided a method of configuring a priority access service in a communications network. The method includes encoding, by a WLAN entity, a service type of the priority service as an enumeration, inserting, by the WLAN entity, the service type into a frame, and transmitting, by the WLAN entity, the frame.

In further embodiments, the priority access service is established between two peer MLDs and the method further includes encoding, by the WLAN entity, link information of a link associated with the priority service as plurality of octets, the plurality of octets indicating if the link may be used for the priority service or is prohibited from being used for the priority service. Also inserting, by the WLAN entity, the link information into the frame.

In further embodiments, the frame is an NSEP Priority Access Request frame or an NSEP Priority Access Response frame.

In further embodiments, the frame is sent by a STA or an MLD, and the frame further includes a set of EDCA or Priority Access parameters based on a traffic characteristic of the priority service.

Embodiments provide the technical benefit of enabling the devices and networks to apply differentiated parameters associated with priority access that are tailored to each type of service. Multiple services can be enabled for NSEP priority access concurrently and can be managed by an access network operator independently of each other.

Embodiments provide the technical benefit of adding of a service type, EDCA or Priority Access parameter set and recommended or prohibited links to NSEP priority access primitives.

Embodiments provide the technical benefit of allowing the association of a NSEP Priority Access service type with a user or with a device and the communication of that service type information when the user or device successfully authenticates with the network, allowing the network AP infrastructure to authorize the user or device for a set of NSEP services. If the user or device requests to establish NSEP Priority Access for a particular service, the WLAN infrastructure can determine whether the user or device is authorized for that service.

Embodiments provide the technical benefit of adding a service type and recommended or prohibited links to NSEP priority access primitives.

Embodiments provide the technical benefit of adding, for a corresponding service type, an EDCA or Priority Access parameter set and recommended or prohibited links to a NSEP Priority Access Request and NSEP Priority Access Response frame.

Embodiments provide the technical benefit of allowing the use of a specific EDCA or Priority Access parameter set for communication of traffic associated with a negotiated NSEP Service Type. Furthermore, this enables the use of a specific set of links for communication between an AP MLD and non-AP MLD for traffic associated with a negotiated NSEP Service Type.

Embodiments provide the technical benefit of allowing the use of an unsolicited NSEP Priority Response frame or an equivalent frame to update parameters associated with a specific NSEP service type during the lifetime of an established service.

Embodiments have been described above in conjunction with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE DRAWINGS

Further features and advantages of the present invention will become apparent from the following detailed description, taken in combination with the appended drawings, in which:

FIG. 5 illustrates primitives and frames that may be used to implement methods described herein with their respective parameters (depending on the WLAN entity for which the primitive or the frame is invoked), according to an embodiment.

It will be noted that throughout the appended drawings, like features are identified by like reference numerals.

DETAILED DESCRIPTION

Figure 1A:
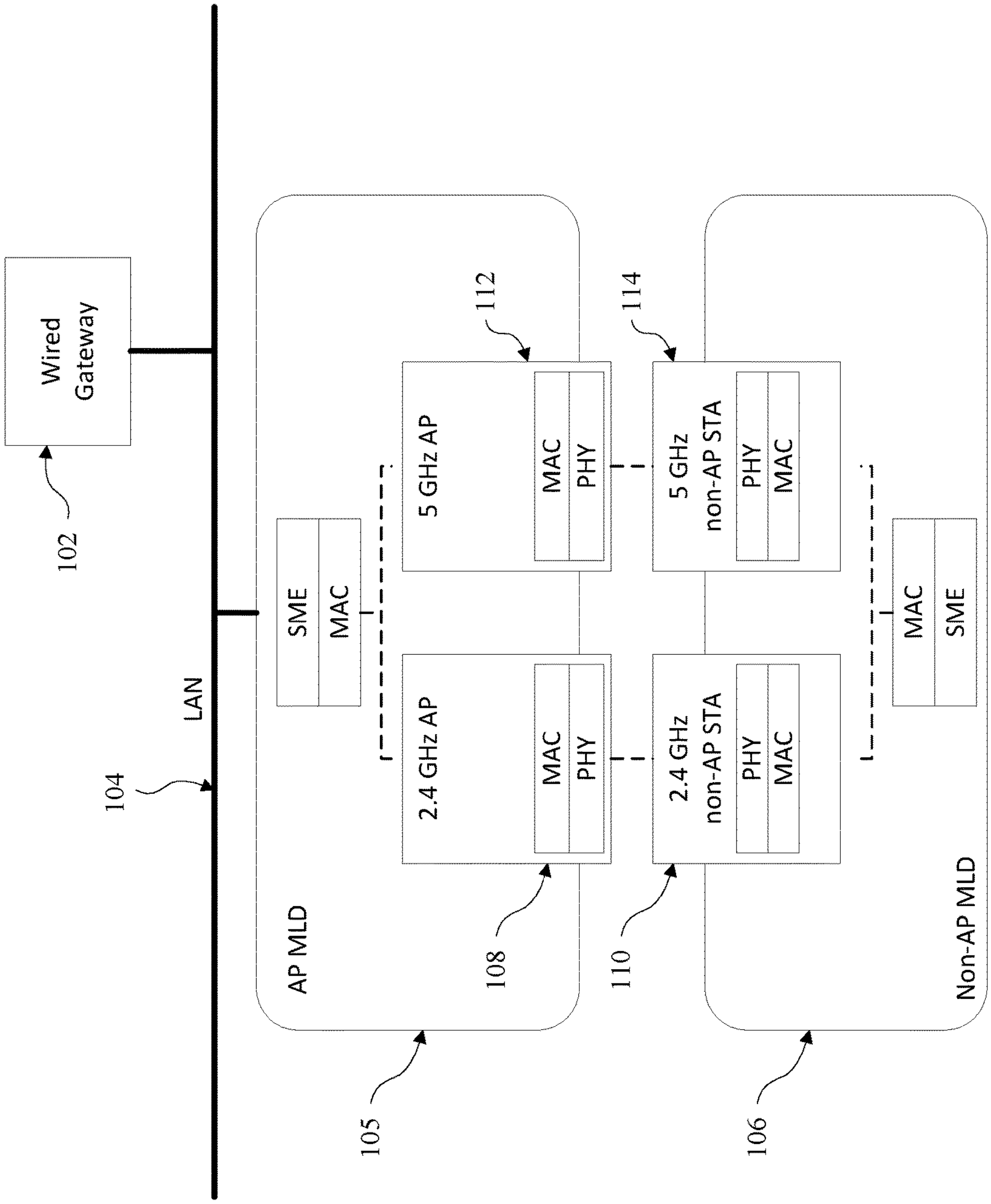
FIG. 1*a* illustrates a multi-link device (MLD) architecture, according to an embodiment.

Embodiments of the present disclosure relate to methods and systems to allow a WLAN entity, such as a non-access point (AP) station (STA) or an AP, to provide National Security and Emergency Preparedness (NSEP) capability by managing and map their radio resources to the requirements of the NSEP access. Embodiments enable the WLAN entity to map radio resources to different types of NSEP services, concurrently if required. Embodiments enable systems to authorize different services to different connected clients.

Embodiments enumerate different NSEP service types and associate each service type with a specific NSEP service. In the AP infrastructure, each NSEP service type may be associated with a corresponding Enhanced Distributed Channel Access (EDCA) parameter set or, in the case of an NSEP Priority Access service type that is established between Multi Link Device (MLD) entities (AP MLD and non-AP MLD) the service type may be applied on a subset of setup links either as a preferred link set or as a prohibited link set. Furthermore, on network Authentication, Authorization and Accounting (AAA) infrastructure, one or more NSEP service types may be assigned to an AAA policy and the AAA policy may be used to define the NSEP priority access service types that are eligible for that associated non-AP STA or non-AP MLD. An AP MLD or a non-AP MLD may assign a subset of setup links to map to the required NSEP service or services, and more than one link can be used to map to a single NSEP service type. Also, more than one NSEP service can be mapped to a single setup link between an AP MLD and non-AP MLD.

Embodiments enable a mechanism to define separate services with the respective parameters, such as EDCA or Priority Access parameters, and specification for specific links. Mechanisms are provided to modify the parameters concurrently during the lifetime of an established service.

Though embodiments may be described with respect to NSEP Priority Access services, other priority service types, or different classes or priorities of service types may be defined, configured, and adjusted using the methods and systems described herein.

As used herein, a station (STA) is a logical entity that is a singly addressable instance of a medium access control (MAC) and physical layer (PHY) interface to a wireless medium (WM). An access point (AP) is an entity that contains at least one logical station (STA) and provides access to the distribution system services, via the wireless medium (WM) for associated STAs. An AP comprises a STA and a distribution system access function. A non-access point (non-AP) station (STA) is a STA that is not contained within an access point (AP).

As used herein, a multi-link device (MLD) is an AP device or non-AP STA device that support multiple radios operating in multiple channels simultaneously. An AP MLD is a multi-link device that has access to the distribution system and includes at least an affiliated AP that is used as an access to the WM. A non-AP MLD is a multi-link device that has no access to the distribution system and includes at least an affiliated non-AP STA that is used as an access to the WM. Associated MLD peers establish a connection across multiple radio peers, which are referred to as setup links. In infrastructure networks, frame exchange over a single link occurs between a non-AP STA affiliated with a non-AP MLD and an AP affiliated with an AP MLD.

With reference to FIG. 1*a*, a typical use case for multi-link operation (MLO) includes a non-AP MLD 106 (such as a WLAN terminal) connecting to an AP MLD 105 using 2 radio links in the 2.4 GHz and 5 GHz WLAN bands. The individual radio links are referred to as links and each of the links between the AP MLD 105 and the non-AP MLD 106 is maintained by an AP affiliated with the AP MLD and a non-AP STA affiliated with the non-AP MLD for each of the different radio channels on which these links are operating. The non-AP MLD 106 includes a 2.4 GHz non-AP STA 110 and a 5 GHz non-AP STA 114. The AP MLD 105 includes a 2.4 GHz AP 108 and a 5 GHz AP 112.

In the IEEE 802.11 standard, a WLAN entity is comprised of the following layers: A station management entity (SME) layer, a medium access control (MAC) layer, and a physical (PHY) layer. The standard includes internal interfaces between these components to describe the interaction of these layers and the behaviour of the WLAN entity. Communication over these internal interfaces is defined by primitives. Communications between an SME layer and a MAC layers, as well as between MAC layers and PHY layers, on the same entity are internal to the device, whereas the communications between MAC/PHY peers take place over the wireless medium.

Each non-AP STA 110 and 114 includes a medium access control (MAC) layer and a physical (PHY) layer. Not shown is the radio antenna(s) to send and receive wireless signals. A 2.4 GHz AP 108 and a 5 GHz AP 112 are affiliated with an AP MLD 105, which exchange frames over setup links with their corresponding 2.4 GHz non-AP STA 110 and the 5 GHz non-AP STA 114, respectively, affiliated with the non-AP MLD 106. The AP MLD interfaces to a LAN 104 for communications with a wired gateway 102 that connects to other networks, such as the Internet. The MAC layer in each MLD interacts to coordinate MAC layer operation in their affiliated STAs. The MAC layer of the affiliated STAs interacts with their respective PHY.

In embodiments, the operation of an MLD may be different from that of two logical STAs (a multiband client) in the same physical entity (e.g., two non-AP STAs in the same handset). Within an MLD the traffic may be coordinated between the two links and one security association may be maintained across them. This provides benefits over the virtual STA concept. For example, an MLD in this document may be a single antenna device or may be a multi-antenna device with two of more antennas. The quantity of antennas included in the MLD is not limited in embodiments. In embodiments, the MLD may allow a service of a same access type to be transmitted on different links, or even allow a same data packet to be transmitted on different or multiple links. Alternatively, data frames corresponding to the same access category can be transmitted on a specific link. Data frames corresponding to different access categories can also be transmitted on different links. For example, data frames corresponding to a video service could use either of Link 1 and Link 2, but data frames corresponding to a voice service could always use Link 1, depending on the environment, and other conditions.

In the case of MLO proposed as part of IEEE 802.11be, priority access, such as the NSEP Priority Access, may be established between an AP MLD 105 and an associated non-AP MLD 106. Priority access protocols may give a device preferential channel access to network communication resources relative to other network devices when frames related to a priority service are exchanged.

In embodiments, each AP affiliated with the AP MLD 105 can also be associated with a legacy non-AP STA. For example, an AP affiliated with an AP MLD 105 operating on the 2.4 GHz radio link could also behave as a legacy AP serving a legacy 802.11 non-AP STA.

In the IEEE 802.11 standard, a WLAN entity is comprised of the following layers: A station management entity (SME) layer, a medium access control (MAC) layer, and a physical (PHY) layer. The standard includes internal interfaces between these components to describe the interaction of these layers and the behaviour of the WLAN entity. Communication over these internal interfaces are defined by primitives. Communications between an SME layer and a MAC layers, as well as between MAC layers and PHY layers, on the same entity are internal to the device, whereas the communications between MAC/PHY peers take place over the wireless medium. A layer, such as the MAC layers of FIG. 1*a* may be logically physically divided between entities. For example, the MAC layer of the non-AP MLD 106 is divided into an upper MAC in the non-AP MLD itself and a lower MAC in the 2.4 GHz non-AP STA 110. The upper MAC layer, which operate on all frames that exchanged with the non-AP MLD (regardless of the link they are transmitted or received) is located with the SME layer while the lower MAC, which operates on the frames that are exchanged with the peer non-AP STA on a specific link is located with the PHY layer.

Figure 1B:
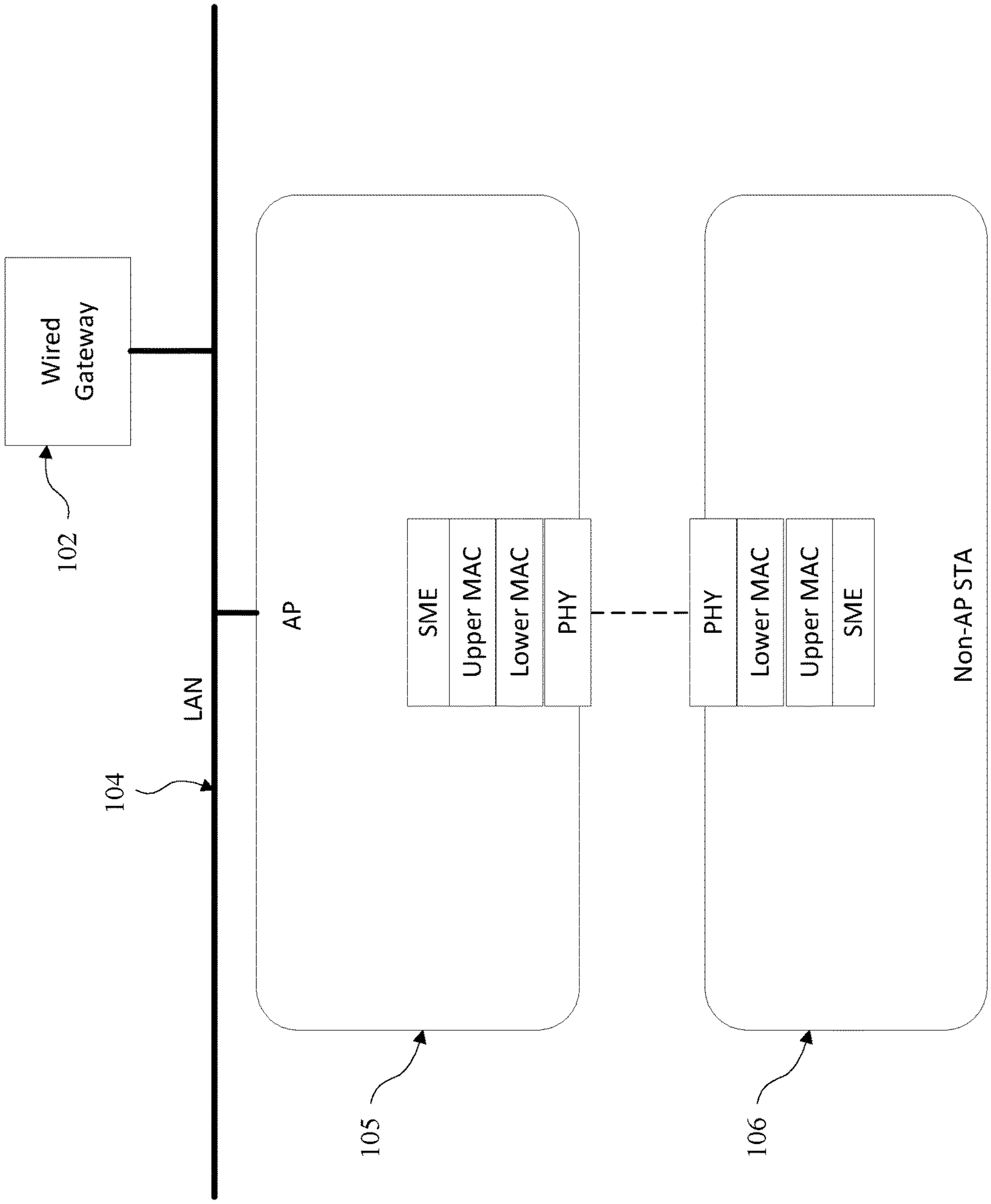
FIG. 1*b* illustrates an architecture with an AP and an associated non-AP STA, according to an embodiment.

FIG. 1*b*, illustrates an embodiment including non-MLD WLAN entities that have only one link. A non-AP STA 106 is associated with an AP 105 using a single radio link.

Figure 2:
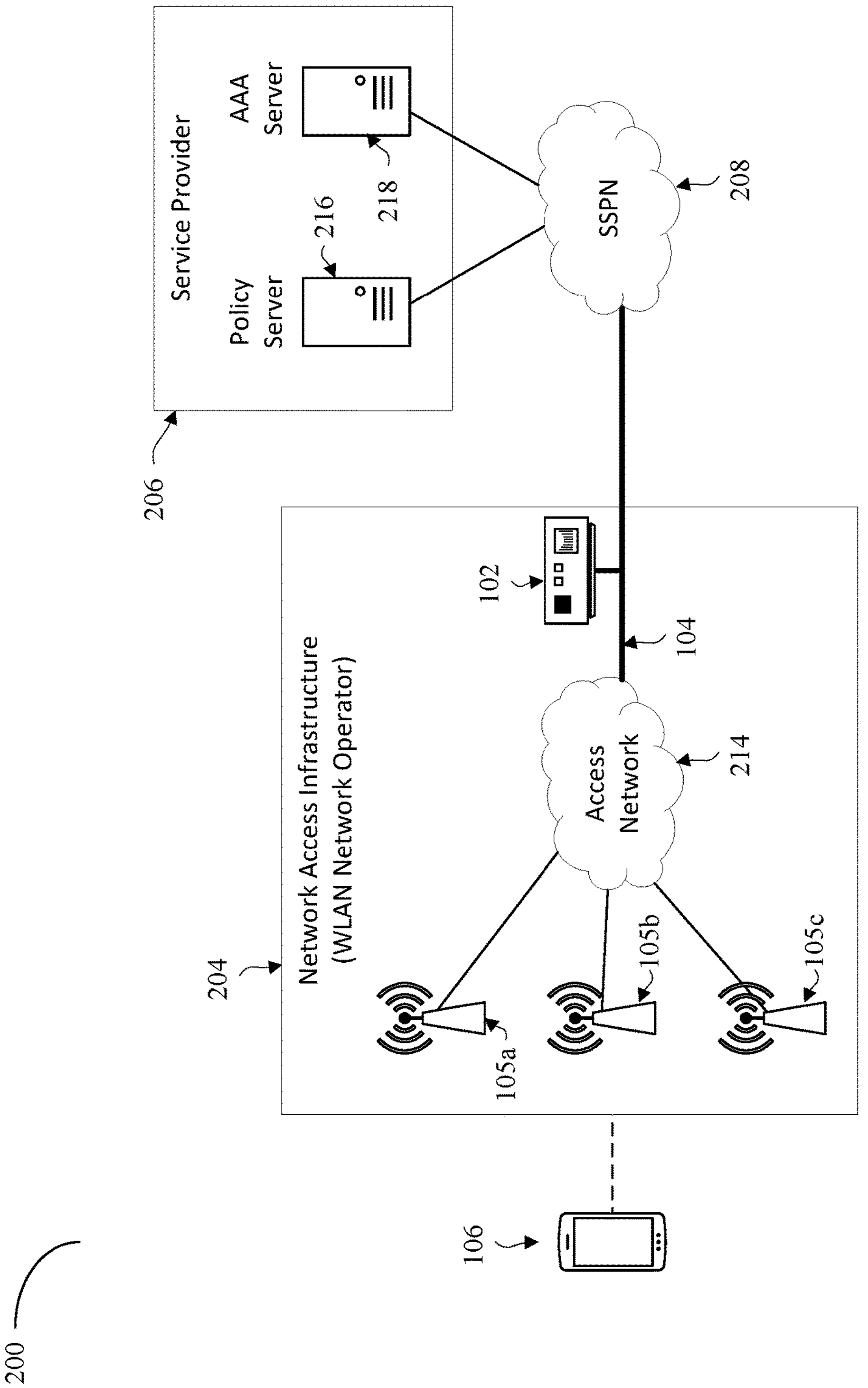
FIG. 2 illustrates a representative network topology for priority access services, according to an embodiment.

FIG. 2 illustrates a representation of a network topology 200 used to facilitate priority access as described herein. A non-AP MLD 106 is associated with to an AP (any of 105*a*, 105*b*, or 105*c*) in the access network that is operated by a WLAN operator. The network access infrastructure 204 is connected to a Subscription Service Provider Network (SSPN) 208, which provides access to a service provider 206 that includes or has access to an Authentication, Authorization, and Accounting (AAA) server 218 and a policy server 216. A non-AP STA 106 may be associated with an AP (any of 105*a*, 105*b*, or 105*c*) in the access network. The access network communicates with the AAA server 218 via authentication protocols such as RADIUS, DIAMETER, or other similar protocols during the authentication procedure of the non-AP STA. The AAA server 218 may authenticate the non-AP STA 106 and retrieve policies for the non-AP STA 106 from the policy server 206 via a protocol such as Lightweight Directory Access Protocol (LDAP) or other similar protocols. Then, the results of the authentication along with any policies may be passed back to the access network. When the authentication procedure is successful, the non-AP STA 106 establishes network connectivity, and the access network applies the network policy for the non-AP STA 106.

As referred to herein, WLAN entity 106 may be either a non-AP MLD as illustrated in FIG. 1*a* or a non-AP STA as illustrated in FIG. 1B. Similarly, WLAN entities 105 (including 105*a*, 105*b*, and 105*c*) may be either an AP MLD as illustrated in FIG. 1*a* or an AP as illustrated in FIG. 1*b*.

In embodiments, priority access may be negotiated between a non-AP STA 106 and an associated AP 105 (any of 105*a*, 105*b*, or 105*c*) under certain circumstances, for example when an event is detected by the non-AP STA 106, the AP 105 or by the SSPN 208. The event prompts an exchange of messages between the non-AP STA 106 and the associated AP 105 to establish network access. During the message exchange, the access network sends a set of wireless medium access parameters which enable the non-AP STA 106 to gain prioritized access to the wireless medium (i.e., channel). In embodiments, the parameter set may be an Enhanced Distributed Channel Access (EDCA) parameter set which corresponds to an Emergency Preparedness Communications Service (EPCS) service type, or a similar set of parameters required to configure and manage the communication channels and links for priority access. Examples of priority service types include emergency voice services, real-time sensor feeds, video camera feeds, incident response systems, etc.

Different types of devices might be authorized for different types of services. For instance, a mobile phone may be used for emergency voice service but not for a temperature sensor service. Therefore, the mobile phone will be authorized for emergency voice while a temperature sensor will be authorized for temperature measurements. Different NSEP services can be characterized by different network traffic characteristics. To prioritize traffic for a particular service, the parameter set may be associated with that service.

Figure 3:
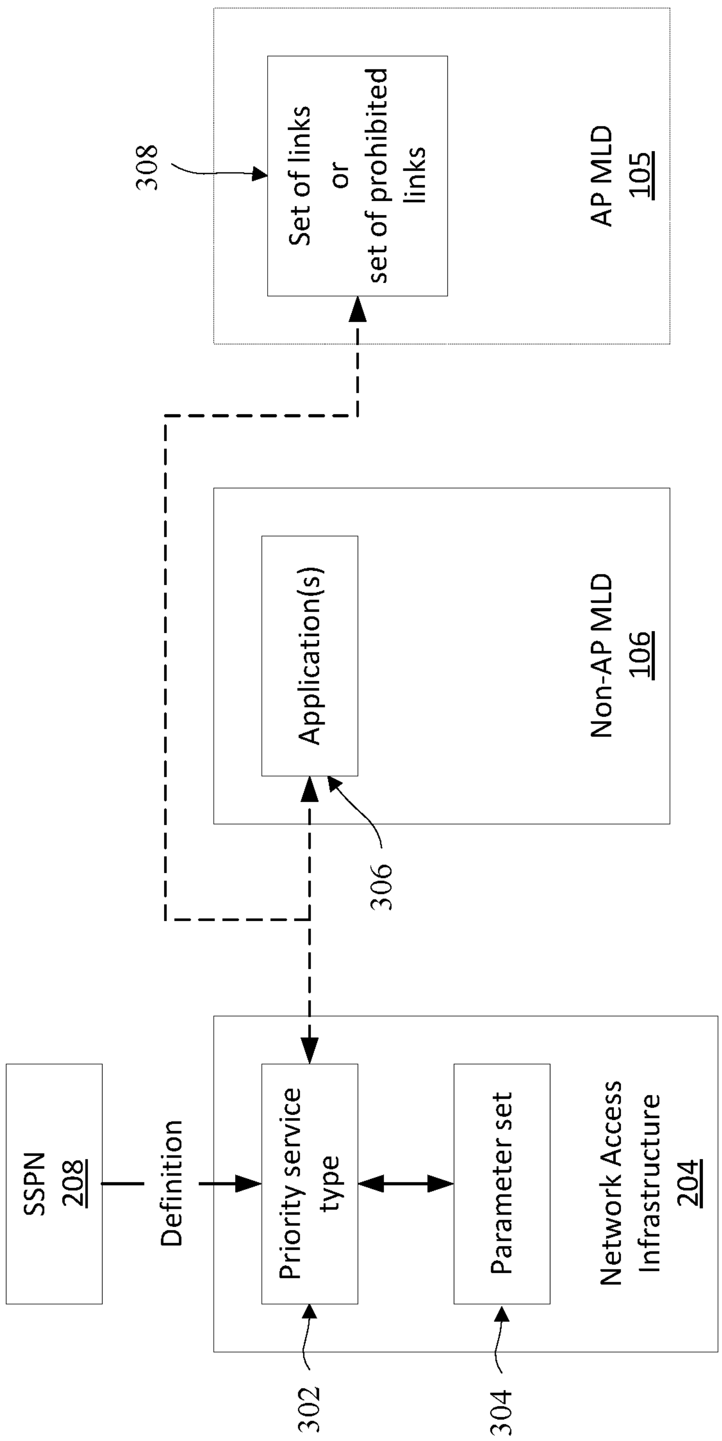
FIG. 3 illustrates the association of priority service types with parameter sets, sets of links, and applications, according to an embodiment.

With reference to FIG. 3, embodiments include different service types 302 that may take advantage of priority access. Different priority services 302 may be defined and configured in the access network or the SSPN network 208. In the access network, each service type 302 is associated with a parameter set 304 and, for connections established between peer MLDs, with a set of links 308, that may include either enabled links, preferred links, prohibited links, or any combination of enabled, preferred, or prohibited links.

In the SSPN 208, a policy server 216 associates service types 302 with device identities. When a device authenticates with the network, the policy server 216 may provide a list of services that the device is authorized to use for priority access, such as NSEP priority access, through the AAA server 218. The list of services is communicated back to the access network. When NSEP priority access is being established, the service type, associated (EDCA) parameter set, and for services established between peer MLDs, the set of recommended or prohibited links are communicated from the AP MLD 105 to the non-AP MLD 106 during the establishment of priority access for the specified service type.

A service provider 206 may define and enumerate different priority service types 302 to be used for NSEP priority access in the access network 214. As an example, the service types 302 could be enumerated to represent emergency voice, a sensor communication, real-time video streaming, real-time messaging, and real-time audio communications or announcements. In the access network, each service type 302 that may be defined by the SSPN 208 is associated with a corresponding EDCA or Priority Access parameter set 304 which may be based on the traffic characteristics of the service. For instance, the EDCA or Priority Access parameter set 304 could give prioritized access to the wireless medium for voice traffic. In the non-AP STA 106, each service defined by the SSPN 208 may be provisioned and in a multi-functional device, could be associated with an application, or multiple applications, running on the device. For MLO, in an AP MLD, each service type 302 defined by the SSPN 208 may be mapped with either a set of links to be used by the AP MLD for that service or a set of prohibited link(s) not to be used by the AP MLD for that service. A non-AP MLD may also be provisioned with a set of preferred links for a given service type 302. The peer MLDs can support multiple services simultaneously, mapping different service types 302 to different setup links depending on the radio resource requirements for the service.

The enumeration and provisioning of service types 302 provides a technical benefit of allowing the device and network to apply differentiated EDCA or Priority Access parameter sets 304 associated with priority access that may be tailored to the type of service 302. Multiple services can be specified by an SSPN 208 operator and be enabled for priority access concurrently and the access network 214 operator may map these service types on their infrastructure network independently of each other.

In embodiments, a policy server 216 may assign one or more service types 302 to an AAA policy. The AAA policy, which may include a set of service types 302, may be associated with a set of devices (or associate with one or more users). This policy assignment may be delivered to the AP or AP MLD for use with a device once the device has successfully authenticated with the network. The policy may be stored on the policy server 216 and communicated to the AP 105 using AAA protocols such as RADIUS or DIAMETER. The list of authorized service types may be sent from the AAA server 216 to the AP or AP MLD 105 for use with the non-AP STA or non-AP STA 106 using attributes, such as RADIUS attributes. After successful authentication, the non-AP STA 106 may be authorized for priority access for those service types. This policy defines the priority access service types that are authorized for the associated non-AP STA or non-AP MLD 106. The policy allows the access network to enable priority access for the device when it is triggered and enabled.

Figure 4:
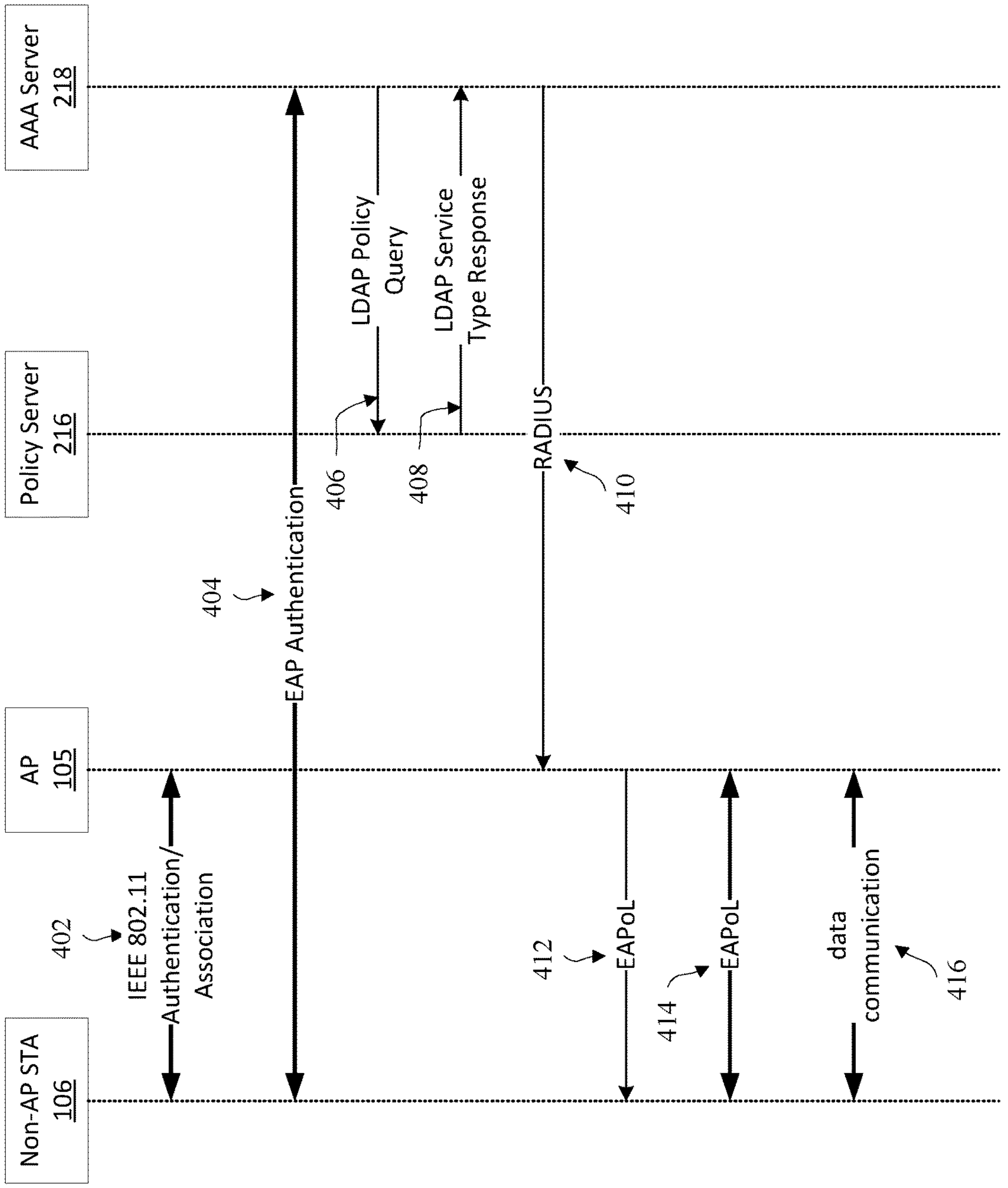
FIG. 4 illustrates message flows for non-AP authentication and network policy application, according to an embodiment.
Figure 6:
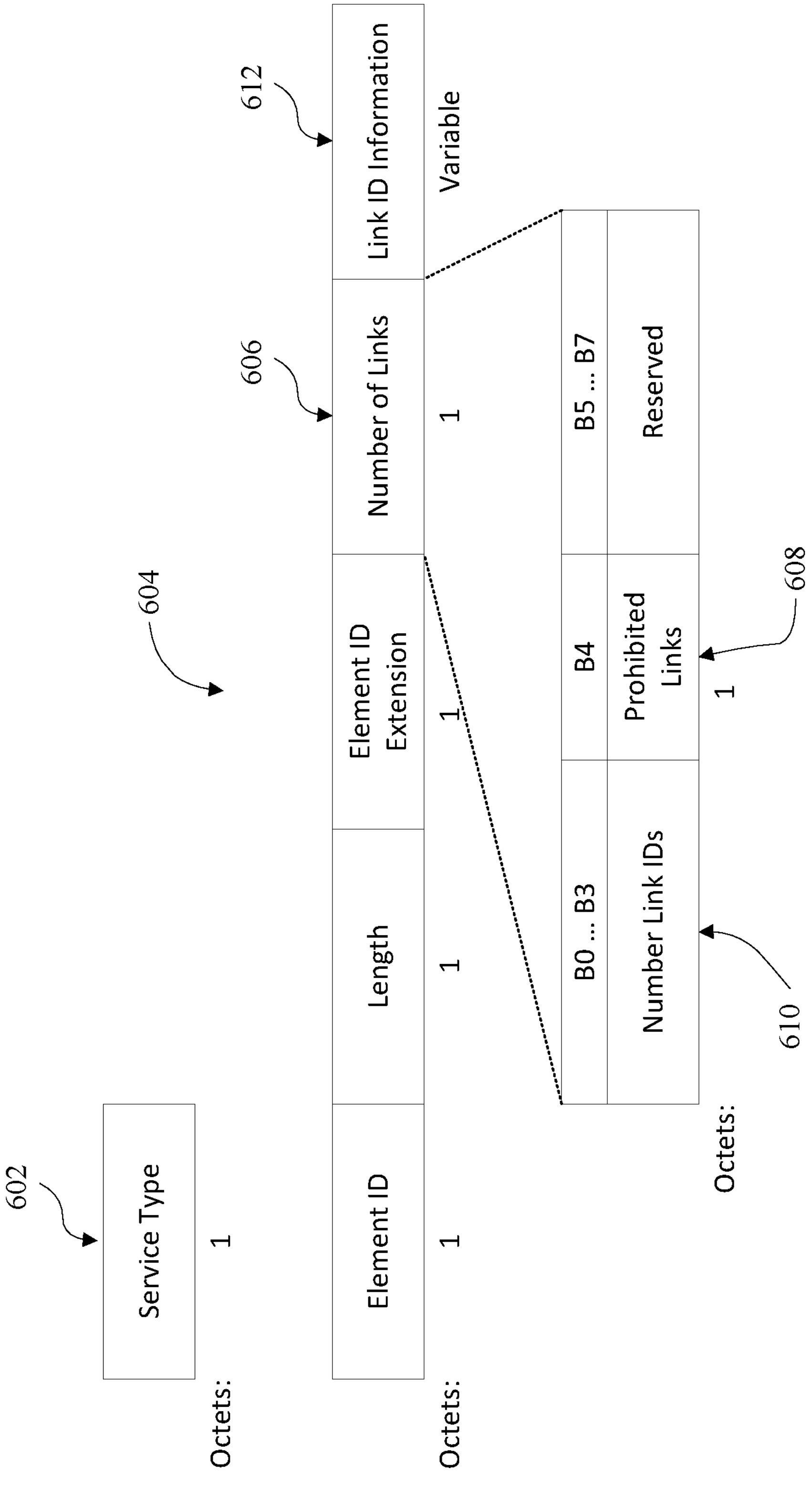
FIG. 6 illustrated how information related to service types and links may be added to frames, according to an embodiment.

FIG. 4, illustrates an embodiment of a message flow for a non-AP STA 106 authenticating and associating with AP 105, and the communication of service types 302 as part of the network policy for the successfully authenticated non-AP STA 106. In step 402, the non-AP STA 106 selects a network and successfully associates and authenticates with an AP 105 using IEEE 802.11 authentication and association procedures for the network. In step 404, the non-AP STA 106 also performs authentication with the AAA server 218 using a protocol such as Extensible Authentication Protocol (EAP) or a similar protocol. In step 406, after successful authentication, the AAA server 218 in the SSPN 208 may query the policy server 216, for example by using an LDAP policy query, for a network policy associated with a user or device identity of the non-AP STA 106. In step 410, after receiving the policy information in step 408, the AAA server 218 may communicate to the AP 105, the policy information corresponding to the non-AP STA 106 in a message indicating successful authentication using protocols such as RADIUS. If the RADIUS protocol is being used, this policy information may be communicated in a RADIUS ACCESS ACCEPT message. After successful authentication, the AP 105 and non-AP STA 106 are authorized to request that specific service for priority access. Priority access service types may be stored locally to verify authorization if the non-AP STA later requests a priority access. In steps 412 and 414, an Extensible Authentication Protocol (EAP) over LAN (EAPoL) protocol may be used to complete the configuration of communications between the AP 105 and the non-AP STA 106, and in step 416 data communications may commence between these STA peers.

The association of priority access service types 302 with a user or device and the communication of that service type information when the user or device successfully authenticates with the network provides the technical benefit of allowing the AP 105 to authorize that device for a set of services. If the user or device requests to establish priority access for a particular service, the AP 105 can determine whether the user or device is authorized for that service.

With reference to FIG. 5, embodiments include primitives that may be incorporated in and used in IEEE 802.11 and other networking protocols to implement priority access methods as described herein. The primitives given in this embodiment reference NSEP protocols, but it will be understood by those skilled in the art that these concepts and teachings may be adapted for use in other networking protocols. Primitives may be used between the SME layer and the MAC layer internal to the non-AP STA 106 or the AP 105.

Embodiments may also modify NSEP Priority Access frames, including the NSEP Priority Access Request frame 504 and the NSEP Priority Access Response frame 510, to implement the priority access methods as described herein.

In embodiments, primitives are exchanged between the SME and MAC layers of WLAN entities. An MLME-NSEP Priority Access Enable.request 502 primitive is sent from the SME layer to the MAC layer. An MLME-NSEP Priority Access Enable.indication 506 primitive is sent from the MAC layer to the SME layer. An MLME-NSEP Priority Access Enable.response 508 primitive is sent from the SME layer to the MAC layer. An MLME-NSEP Priority Access Enable.confirm 512 primitive is sent from the MAC layer to the SME layer.

In embodiments, primitives and frames specify the service type that they apply to. Primitives and frames invoked by an AP or AP MLD 105 may specify an EDCA or Priority Access parameter set. Primitives and frames utilized by or between an AP MLD 105 and a non-AP MLD 106 may specify sets of links to be used or not used by the service.

The SME layer of a STA may include the following parameters in an MLME-NSEP PRI ACCESS ENABLE.request primitive 502 that may initiate the establishment of an NSEP Priority Access service with a specific peer STA. Primitive 502 includes information such as a service type (one of the enumerated service types defined by the SSPN 208). If invoked by an AP or AP MLD, primitive 502 may include an EDCA or Priority Access Parameter Set to be used for the service type. If invoked by an AP MLD or non-AP MLD, primitive 502 may further include a set of links. The set of links may include a set of recommended links to be used for that service type, or a set of prohibited links for that service type if the initiating SME is within an MLD.

Upon receipt of an MLME-NSEP PRI ACCESS ENABLE.request primitive 502, a MAC layer of the same WLAN entity shall initiate the transmission of an NSEP Priority Access Request frame 504 to the MAC layer of its associated station. The frame 504 includes information such as a service type (one of the enumerated service types defined by the SSPN 208). If the MAC layer is associated with an AP or AP MLD, primitive 502 may include an EDCA Parameter Set to be used for the service type. If the MAC layer is associated with an AP MLD or non-AP MLD, primitive 502 may further include a set of links. The set of links may include a set of recommended links to be used for that service type, or a set of prohibited links for that service type if the initiating SME is within an MLD. In embodiments, the parameters of the NSEP Priority Access Request frame 504 may be taken from the MLME-NSEP PM ACCESS ENABLE.request primitive 502 that triggered the sending of the NSEP Priority Access Request frame 504.

For a STA, the service type, associated EDCA Parameter Set (if included), and list of recommended or prohibited links (if included for an MLD) may conform to the network policy communicated by the SSPN 208.

In embodiments, the parameters of the NSEP Priority Access Request frame 504 may be taken from the MLME-NSEP PRI ACCESS ENABLE.request primitive 502 that triggered the sending of the NSEP Priority Access Request frame 504.

In response to receiving an NSEP Priority Access Request frame 504, an MLME-NSEP PM ACCESS ENABLE.indication primitive 506 is generated by the receiving MAC layer and sent to its SME layer. If the SME layer is of AP or AP MLD, it may validate that the requested NSEP Service Type and the set of recommended or prohibited links (if included by an MLD) conform to the policy associated with the device and the setup links between the peer MLDs and generate an MLME-NSEP PM ACCESS ENABLE.response primitive 508. Both the primitive 506 and 508 includes information such as a service type (one of the enumerated service types defined by the SSPN 208), the primitive 508 may include an EDCA Parameter Set to be used for the service type (if invoked by an AP or AP MLD), and a set of links (if the initiating entity is an MLD, such as an AP MLD or a non-AP MLD). The set of links may include a set of recommended links to be used for that service type, or a set of prohibited links for that service type.

Upon receipt of an MLME-NSEP PM ACCESS ENABLE.response primitive 508, a MAC layer of the same WLAN entity shall initiate the transmission of an NSEP Priority Access Response frame 510 to the MAC layer of its associated WLAN entity. The frame 510 includes information such as a service type (one of the enumerated service types defined by the SSPN 208). If the request primitive was invoked by an AP or AP MLD, primitive 508 may include an EDCA Parameter Set to be used for the service type. If the WLAN entity is an AP MLD or non-AP MLD, the frame 510 may further include a set of links. The set of links may include a set of recommended links to be used for that service type, or a set of prohibited links for that service type if the initiating SME is within an MLD.

In response to receiving an NSEP Priority Access Response frame 510, an MLME-NSEP PM ACCESS ENABLE.confirm primitive 512 is generated by the receiving MAC layer to send to its SME layer. The SME layer may validate that the requested NSEP Service Type and the set of recommended or prohibited links (if included by an MLD) conform to the policy associated with the device and the setup links between the peer MLDs. The primitive 512 includes information such as a service type (one of the enumerated service types defined by the SSPN 208), an EDCA Parameter Set to be used for the service type (if invoked by a non-AP STA or non-AP MLD), and a set of links (if the initiating entity is an MLD, such as an AP MLD or a non-AP MLD). The set of links may include a set of recommended links to be used for that service type, or a set of prohibited links for that service type.

In embodiments, the MLME-NSEP PRI ACCESS ENABLE.response primitive 508 shall initiate the MAC layer to send an NSEP Priority Access Response frame 510 to the peer STA. If the SME is of an AP or AP MLD, it will configure its MAC layer with the EDCA or Priority Access Parameter Set and if the SME is of an MLD, it will configure its MAC layer with link information (i.e., used links or prohibited links if included by an MLD) for NSEP Priority Access traffic corresponding to that service type.

Upon receipt of an MLME-NSEP PRI ACCESS ENABLE.confirm primitive 512, the SME layer may validate that the NSEP Service Type and the set of recommended or prohibited links (if included by an AP MLD) that conform to those requested. The SME layer may configure its MAC layer with the EDCA parameter set and link information (i.e., used links or prohibited links if included by an MLD) for the NSEP priority access traffic corresponding to that service type.

In embodiments, the addition of service type and recommended or prohibited links (if included by an MLD) in priority access primitives, such as those used for NSEP, provide many technical benefits. In addition to recommended and prohibited links, other types of links may also be defined such as required links, or links with different priorities.

Embodiments may be used to add parameters to an NSEP Priority Access Request frame 504 and to an NSEP Priority Access Response frame 510 to establish NSEP Priority access service between MLD peers. In particular, parameters related to a service type and a list of either recommended links or prohibited links may be included in an NSEP Priority Access Request frame 504 and in an NSEP Priority Access Response frame 510.

A Service Type field may be defined by a 1 octet field 602 and indicate the enumerated NSEP service type defined by the SSPN. For example, if the NSEP service types include emergency voice services, real-time sensor feeds, video camera feeds, and incident response systems, emergency voice services may be indicated by a service type=0, real-time sensor feeds may be indicated by a service type=1, video camera feeds may be indicated by a service type=2, and real-time sensor feeds may be indicated by a service type=3. One octet will allow up to 256 different service types to be defined. In embodiments, a single Service type is established at a time.

The set of recommended or prohibited links may be included in a NSEP Link Element 604 that includes a number of fields. A Number of Links field 606 may indicate the number of recommended or prohibited links including a flag 608 to indicate whether the links are prohibited or recommended. The Number Link IDs field 610 may indicate a number of Link ID Info fields 610 in the NSEP Link Element 604. The Prohibited Links field 608 may be set to 1 to indicate that the links are prohibited for a particular NSEP Priority Access service. The Prohibited Links field 608 may be set to 0 to indicate that the links are recommended for a particular NSEP Priority Access service. The Link ID Info field 612 may contain a Link ID for a link specified in the NSEP Link Element 604.

In embodiments, an AP affiliated with the initiating AP MLD 105, or a STA affiliated with the initiating non-AP MLD 106, may include the Service Type field 602 in the NSEP Priority Access Request frame 504 or the NSEP Priority Access Response frame 510 that it generates. Any of the STAs affiliated with the MLD may include the NSEP Link Element 604 in the NSEP Priority Access Request frame 504 or the NSEP Priority Access Response frame 510 that it generates. For MLO, the NSEP Link Element 604 element may indicate either a list of recommended links for communications, or a list of prohibited links for communications. In addition, the (non-MLD) AP or the AP affiliated with the AP MLD, may include the EDCA or Priority Access Parameter Set element in an NSEP Priority Access Request frame 504 or in an NSEP Priority Access Response frame 510 that it generates. The values included in the EDCA or Priority Access Parameter Set element should conform to the service type for which the NSEP Priority Access is established.

There are technical benefits realized by the addition of a service type, parameter set corresponding to that service type, and recommended or prohibited links in an NSEP Priority Access Request frame 504 and an NSEP Priority Access Response frame 510 to establish NSEP Priority access service between MLD peers.

In embodiments, once NSEP priority access has been negotiated, for example by use of the method illustrated in FIG. 4, the NSEP priority access service will be applied for the established service type between an associated pair of AP 105 and non-AP STA 106, or an associated pair of AP MLD and non-AP MLD.

The channel access rules for NSEP Priority Access may be defined in accordance with the EDCA or priority access parameter set for the negotiated link set that is defined by the AP 105 or AP affiliated with an AP MLD 105 during service establishment instead of other default parameters that may have been advertised by the AP 105 or AP affiliated with an AP MLD 105 in Beacon and Probe Response frames that may have been transmitted. The EDCA or priority access parameters used are applicable to traffic corresponding to the service type that was negotiated. In the case of an MLD, the links on which the frames will be exchanged by both peer MLDs (i.e., AP MLD 105 and non-AP MLD 106) with regard to the established service type, will either follow the links defined in the set of recommended links or exclude the links defined in the prohibited links set, as recommended by the MLME-NSEP PRI ACCESS ENABLE.request 502 primitive and finalized by the MLME-NSEP PM ACCESS ENABLE.response 508 primitive. Priority access for multiple, different service types may be negotiated independently and can operate concurrently between a non-AP STA 106 and an AP 105 pair.

Figure 7:
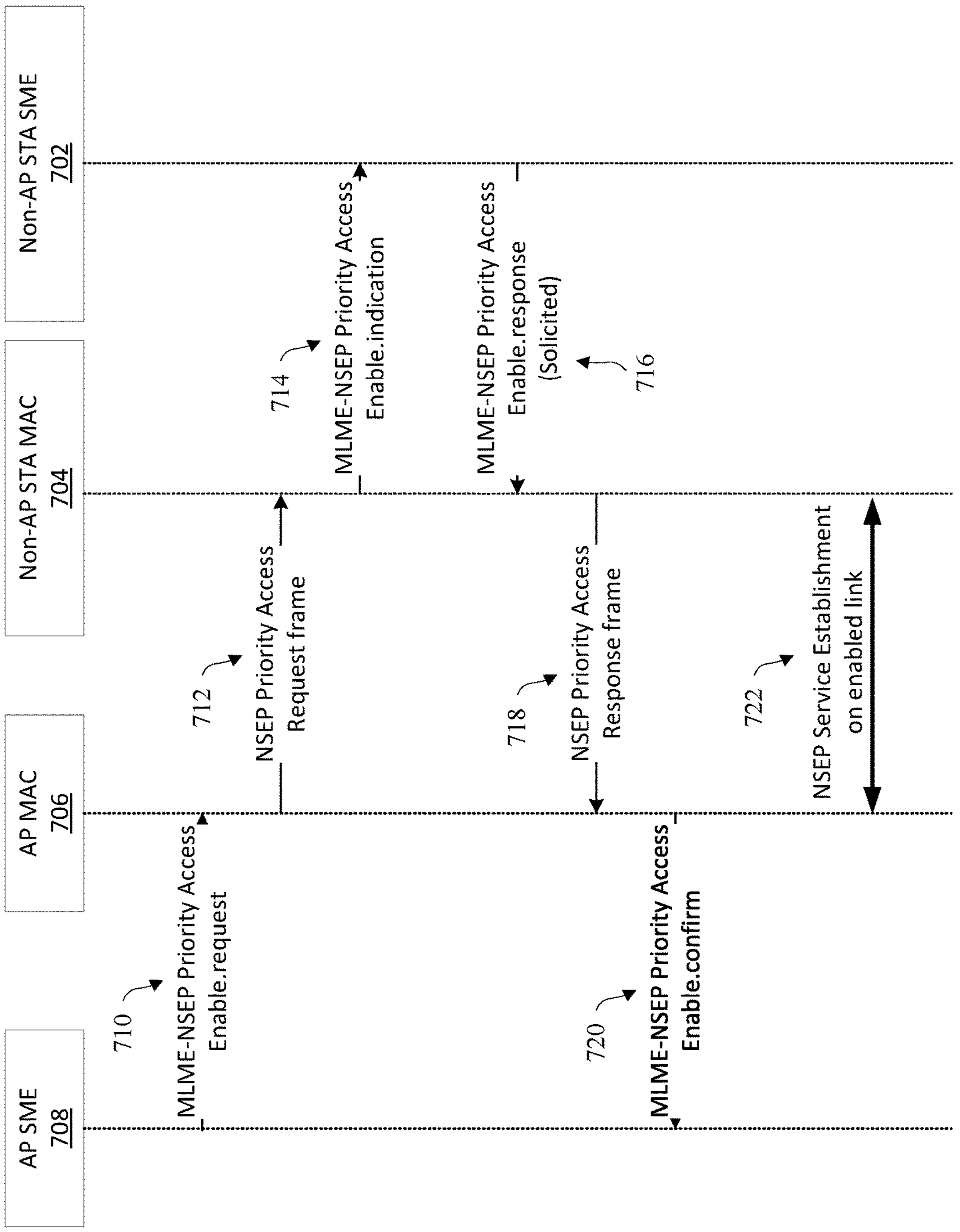
FIG. 7 illustrates primitives and frames that may be used for priority service access and service establishment, according to an embodiment.

FIG. 7 illustrates an embodiment including a method for NSEP priority access negotiation and service establishment when initiated by an AP MLD 105. Though FIG. 7 illustrates the case where the method is initiated by the AP or AP MLD side, it should be understood that the method may also be initiated by the non-AP STA or the non-AP MLD side, where the primitives and frames used include the parameters as described with reference to FIG. 5.

In step 710, an external event may trigger the SME layer 708 of the APMLD 105 to invoke and send an MLME NSEP PRI ACCESS ENABLE.request primitive 502 to the MAC layer 706 of the AP MLD 105. In step 712, the MAC layer 706 initiates the transmission of an NSEP Priority Access Request frame 504 (by an affiliated AP105) that includes a service type, a set of recommended or prohibited links (included for an MLD), and a EDCA or Priority Access parameter set.

The NSEP Priority Access request frame is received by the MAC layer 704 of the non-AP MLD 106 through a STA affiliated with the non-AP MLD and in step 714, the MAC layer 704 may send an MLME NSEP PM ACCESS ENABLE.indication primitive 506 to the SME layer 702. In step 716, the SME layer 702 may respond with an MLME NSEP PRI ACCESS ENABLE.response primitive 508 to trigger, in step 718, the transmission of an NSEP Priority Access Response frame 510 to the peer STA operating on the link that the request frame was sent. The NSEP Priority Access Response frame 510 may include the service type and set of recommended or prohibited links in the frame 510. After successfully initiating the transmission of the frame 510, the SME layer 708 of the non-AP MLD 106 may then configure the parameter set in the MAC layer 706 of the non-AP MLD 106 along with the link information. The MAC layer 706 of AP MLD 105 receives the NSEP Priority Access Response frame 510 and, in step 720 sends an MLME NSEP PM ACCESS ENABLE.confirm primitive 512 to the SME layer 708. The SME layer 708 of the AP MLD 105 may also configure the parameter set in the MAC layer 706 of the AP MLD 105 along with the link information. In step 722, traffic associated with that service type may then be transmitted using the negotiated parameter set over the set of negotiated links.

In embodiments, an NSEP Priority Access Request frame 504 transmitted by a MAC layer of a WLAN entity may receive its parameters from the MLME NSEP PM ACCESS ENABLE.request primitive 502 received from its SME. Also, an MLME NSEP PRI ACCESS ENABLE.indication primitive 506 may be generated by the MAC layer of a WLAN entity with parameters received in the NSEP Priority Access Request frame 510 received by its WLAN entity. Furthermore, an NSEP Priority Response frame 510 is transmitted by the MAC layer of a WLAN entity with the parameters received in the MLME NSEP PRI ACCESS ENABLE.response primitive 508. The value of the parameters in the MLME NSEP PM ACCESS ENABLE.response primitive 508 are determined by the SME layer based on the parameters received in the MLME NSEP PM ACCESS ENABLE.indication primitive 506. An MLME NSEP PRI ACCESS ENABLE.confirm primitive 512 is generated by the MAC layer of a WLAN entity with parameters received in the NSEP Priority Response frame 510 by a WLAN entity.

The use of a specific EDCA or Priority Access parameter set for communication between an AP MLD 105 and a non-AP MLD 106 for traffic associated with a negotiated NSEP Service Type provides technical benefits as it allows for the use of a specific set of links for communication between the AP MLD 105 and the non-AP MLD 106 for traffic associated with a negotiated NSEP Service Type.

In an embodiment, multiple priority services, such as NSEP services, can operate concurrently. However, to optimize traffic flow when multiple services are operating, or to address any other conditions in the wireless network, an AP or an AP MLD 105 can update the priority service configuration to accommodate the aggregation, de-aggregation, or optimization of priority services. This can be done by transmitting an unsolicited mode of a frame, such as an NSEP Priority Access Response frame 510, indicating a service type.

Figure 8:
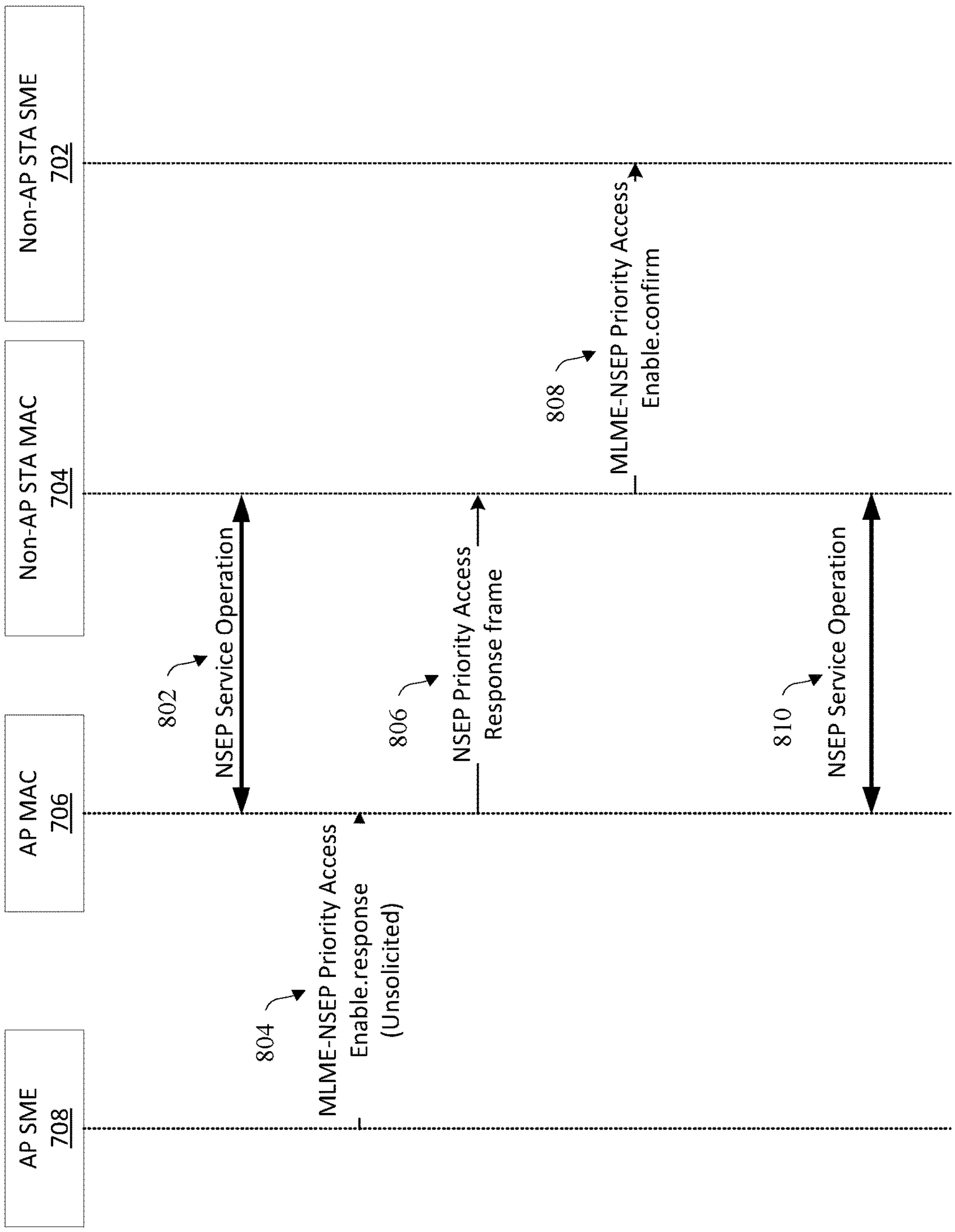
FIG. 8 illustrates message flows that may be used to update priority service parameters corresponding to an existing service type, according to an embodiment.

An unsolicited update could take the form of an update of link mapping (by an AP MLD 105 or a non-AP MLD 106) or an update to the parameter set (when invoked by an AP or an AP MLD 105 only). FIG. 8 illustrates an embodiment of an AP MLD 105 using an unsolicited mode, such as an unsolicited NSEP Priority Access Response frame 510, to update parameters for a particular priority access service type. Though FIG. 8 illustrates the case where the method is initiated by the AP or AP MLD side, it should be understood that the method may also be initiated by the non-AP STA or the non-AP MLD side, where the primitives and frames used include the parameters as described with reference to FIG. 5.

In step 802, an NSEP service is in operation, being previously configured and enabled using methods described herein. An event triggers a change to the parameters associated with the priority access service for an existing specific service type, and in step 804, the SME layer 708 of the AP MLD 105 may send MLME NSEP PM ACCESS ENABLE.response primitive 508 to the MAC layer 706 of the AP MLD 105. In step 806, the MAC layer 706 of the AP affiliated with an AP MLD 105 shall send an unsolicited response frame, such as an NSEP Priority Access Enable Response frame 510 to the MAC layer 704 of the 106 non-AP STA affiliated with a non-AP MLD 106. In step 808, the MAC layer sends an MLME NSEP PRI ACCESS ENABLE.confirm 512 to the SME layer 702 of the non-AP MLD 106. Both devices update their parameters associated with that service type and, in step 810, continue exchanging frames related to that NSEP Priority Access service.

In embodiments, a dedicated frame could be defined to signal a change to the NSEP priority service access configuration. The new frame could be called an (NSEP) Priority Access Update frame with the same or a similar format to the NSEP Priority Access Response frame 510 when used in an unsolicited mode.

In embodiments, an unsolicited NSEP Priority Access Response frame 510 is transmitted by the MAC layer of a WLAN entity with parameters included in the receipt of an MLME NSEP PM ACCESS ENABLE.response primitive 508. An MLME NSEP PM ACCESS ENABLE.confirm primitive 512 is generated by the MAC layer of a WLAN entity with parameters received in an unsolicited NSEP Priority Access Response frame 510.

The use of an unsolicited NSEP priority access response frame or an equivalent frame provides the technical benefit of updating parameters associated with a specific priority service type during the lifetime of an established service.

Figure 9:
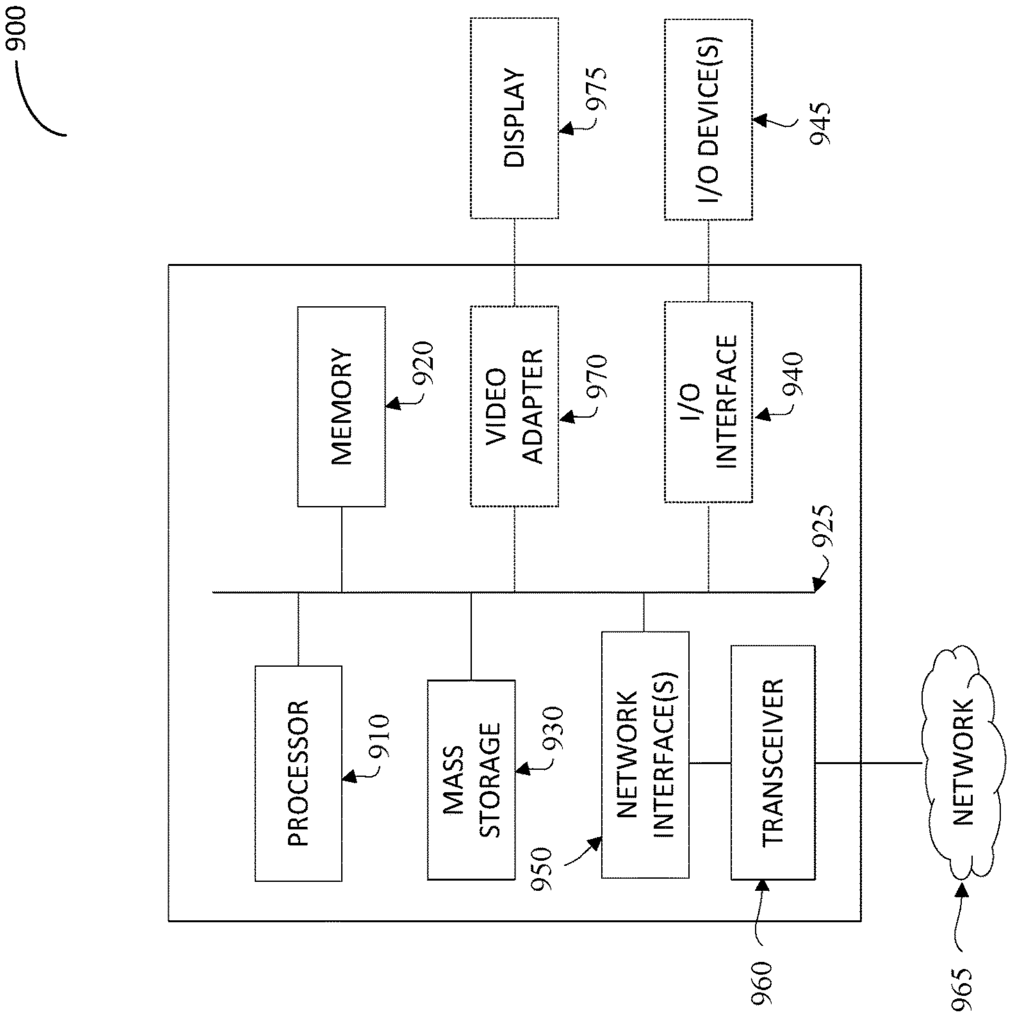
FIG. 9 illustrates an electronic device that may be used to implement the methods as described herein, according to an embodiment.

FIG. 9 is a schematic diagram of an electronic device 900 that may perform any or all of operations of the above methods and features explicitly or implicitly described herein, according to different embodiments of the present invention. For example, an electronic device such equipped with network function may be configured as an AP 105, non-AP STA 106, AP MLD 105 or non-AP MLD 106, or any other networking equipment or server as described herein.

As shown, the device includes a processor 910, such as a central processing unit (CPU) or specialized processors such as a graphics processing unit (GPU) or other such processor unit, memory 920, non-transitory mass storage 930, I/O interface 940, network interface 950, video adaptor 970, and one or more transceivers 960, all of which are communicatively coupled via bi-directional bus 925. A video adapter 970 may be connected to one or more of display 975 and I/O interface 940 may be connected to one or more of I/O device 945 which may be used to implement a user interface. According to certain embodiments, any or all of the depicted elements may be utilized, or only a subset of the elements. Further, the device 900 may contain multiple instances of certain elements, such as multiple processors, memories, or transceivers. Also, elements of the hardware device may be directly coupled to other elements without the bi-directional bus. Additionally, or alternatively to a processor and memory, other electronics, such as integrated circuits, may be employed for performing the required logical operations.

The memory 920 may include any type of non-transitory memory such as static random access memory (SRAM), dynamic random access memory (DRAM), synchronous DRAM (SDRAM), read-only memory (ROM), any combination of such, or the like. The mass storage element 930 may include any type of non-transitory storage device, such as a solid state drive, hard disk drive, a magnetic disk drive, an optical disk drive, USB drive, or any computer program product configured to store data and machine executable program code. According to certain embodiments, the memory 920 or mass storage 930 may have recorded thereon statements and instructions executable by the processor 910 for performing any of the aforementioned method operations described above.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be at least partially implemented as coded instructions in a computer program product. In other words, the computer program product is a computer-readable medium upon which software code is recorded to execute the method when the computer program product is loaded into memory and executed on the microprocessor of wireless communication devices.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

In accordance with an aspect, there is provided a method for configuring services in a communications network. The method includes defining, by a service provider, a service type, and associating, by the service provider of the service type, the service type with an Enhanced Distributed Channel Access (EDCA)/Priority Access parameter set on an Access Point (AP) infrastructure. Then associating the service type with a WLAN entity.

In an aspect, the WLAN entity is a multi-link device (MLD) and the service type is associated with a set of links of the WLAN entity.

In an aspect, the set of links includes a subset of links to be used for the service type.

In an aspect, the set of links includes a subset of links that is prohibited to use for the service type.

In an aspect, the defining of the service type includes enumerating a plurality of service types including the service type.

In an aspect, the associating of the service type with the EDCA/Priority Access parameter set is based on a traffic characteristic of the service type.

In an aspect, the service type is associated with an application of a non-AP STA.

In accordance with an aspect, there is provided a method for configuring services in a communications network. The method includes assigning, by an authentication server, a service type to an authorization policy, and associating the authorization policy to a Wireless Local Area Network (WLAN) entity of a non-AP Station (STA) or a non-AP MLD. Also, sending, in response to the WLAN entity authenticating to the communications network, a network policy of the service type to AP infrastructure.

In an aspect, sending the network policy to the AP infrastructure is performed using Authentication, Authorization and Accounting (AAA) protocols.

In accordance with an aspect, there is provided a method for configuring services in a communications network. The method includes sending, by a WLAN entity, an NSEP priority access frame, the frame including a service type of the service.

In an aspect, the frame is an NSEP priority access request frame.

In an aspect, the frame is an NSEP priority access response frame.

In an aspect, the NSEP priority access response frame is sent in response to the WLAN entity receiving an NSEP priority access request frame.

In an aspect, the NSEP priority access response frame is sent to modify the parameters of a previously established NSEP Service Operation.

In an aspect, the WLAN entity is an access point (AP), and the frame further includes an EDCA or priority access parameter set to be used for the service type.

In an aspect, the AP is an AP affiliated with an AP multi-link device (MLD), and the frame further includes a set of links of the service type.

In an aspect, the WLAN entity is a non-access point (AP) station (STA).

In an aspect, the non-AP STA is affiliated with a non-AP multi-link device (MLD), and the request frame further includes a set of links of the service type.

In an aspect, the set of links includes a subset of links to be used for the service type.

In an aspect, the set of links includes a subset of links that is prohibited to use for the service type.

In an aspect, the links conform to a network policy received from a subscription service provider network.

In an aspect, the sending of the NSEP priority access request frame is sent in response to the MAC layer receiving a request primitive from an SME layer of the WLAN entity.

In accordance with an aspect, there is provided a method of configuring a priority access service in a communications network. The method includes encoding, by a WLAN entity, a service type of the priority service as an enumeration, inserting, by the WLAN entity, the service type into a frame, and transmitting, by the WLAN entity, the frame.

In further aspects, the priority access service is established between two peer MLDs and the method further includes encoding, by the WLAN entity, link information of a link associated with the priority service as plurality of octets, the plurality of octets indicating if the link may be used for the priority service or is prohibited from being used for the priority service. Also inserting, by the WLAN entity, the link information into the frame.

In an aspect, the frame is an NSEP Priority Access Request frame or an NSEP Priority Access Response frame.

In an aspect, the frame is sent by an access point (AP) or an AP multi-link device (MLD), and the frame further includes a set of EDCA or Priority Access parameters based on a traffic characteristic of the priority service.

In an aspect, the frame is an NSEP Priority Access response frame and is sent in response to receiving an NSEP Priority Access Request frame.

In an aspect, the frame is an NSEP Priority Access response frame and is sent to modify a previously established NSEP Service Operation.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations, or equivalents that fall within the scope of the present invention.

The invention claimed is:

1. A method for configuring priority access services in a communications network, the method comprising:

defining, by a service provider, a list of a plurality of types of priority access services;

associating, by the service provider, each type of priority access service from among the list of types of priority access services with a respective Enhanced Distributed Channel Access (EDCA)/Priority Access parameter set on an Access Point (AP) infrastructure; and provisioning a Wireless Local Area Network (WLAN) entity with one type of priority access service from among the list of types of priority access services in accordance with the respective EDCA/Priority Access parameter set.

2. The method of claim 1 wherein the WLAN entity is a multi-link device (MLD) and the one type of priority access service is provisioned using a set of links of the WLAN entity.

3. The method of claim 2 wherein the set of links is a subset of links from among a group of links of the WLAN entity selected for provisioning the one type of priority access service.

4. The method of claim 3 wherein the group of links includes a further subset of links that is prohibited from provisioning the one type of priority access service.

5. The method of claim 1 wherein the associating of each type of priority access service with the respective EDCA/

Priority Access parameter set is based on a respective traffic characteristic of the respective type of priority access service.

6. The method of claim 1 wherein the associating of the respective EDCA/Priority Access parameter set of each type of priority access service on the AP infrastructure is performed using Authentication, Authorization and Accounting (AAA) protocols.

7. A method for configuring a service in a communications network, the method performed by an Access Point (AP) or an AP multi-link device (MLD), the method comprising:

sending, to a specific non-AP Station (STA) or a specific non-AP MLD having a previously established National Security and Emergency Preparedness (NSEP) Service Operation, an unsolicited NSEP priority access response frame to modify parameters of the previously established NSEP Service Operation, the unsolicited NSEP priority response frame indicating one type of priority access service from among a list of a plurality of types of priority access services.

8. The method of claim 7 wherein the unsolicited NSEP priority access response frame further includes an Enhanced Distributed Channel Access (EDCA) or priority access parameter set to be used by the specific non-AP STA or the specific non-AP MLD.

9. The method of claim 8 wherein the AP is an AP affiliated with an AP multi-link device (MLD), and at least one parameter modified by the unsolicited NSEP priority access response frame further includes a set of links for use by the specific non-AP MLD.

10. The method of claim 9 wherein the set of links includes a subset of links to be used for the service type.

11. The method of claim 9 wherein the set of links includes a subset of links that is prohibited to use for the service type.

12. The method of claim 9 wherein the set of links conform to a network policy received from a subscription service provider network.

13. The method of claim 7 wherein the sending of the unsolicited NSEP priority access response frame is in response to a medium access control (MAC) layer receiving a response primitive from a station management entity (SME) layer of the WLAN entity.

14. A method of configuring a priority access service in a communications network, the method performed by a non-access point (AP) Station (STA) or a non-AP multi-link device (MLD), the method comprising:

maintaining a previously established National Security and Emergency Preparedness (NSEP) service operation with an AP or an AP MLD according to a first set of parameters and according to a type of priority access service from among a list of a plurality of types of priority access services;

receiving, from the AP or the AP MLD, an unsolicited NSEP priority access response frame indicating the one type of priority access service and containing a second, different set of parameters for the established NSEP service operation; and in response to receiving the unsolicited NSEP priority access response frame, updating the established NSEP service operation to use the second set of parameters.

15. The method of claim 14, wherein the priority access service is established between the non-AP MLD and the AP MLD, wherein the second set of parameters contained in the received unsolicited NSEP priority access response frame comprises link information, and the step of updating the established NSEP service operation further comprises interpreting the link information to configure the established NSEP service operation to exclude a subset of one or more links of the non-AP MLD that are indicated as prohibited for the priority access service.

16. The method of claim 14 wherein:

the one type of priority access service is indicated by an enumeration;

the method further comprises extracting, from the received unsolicited NSEP priority access response frame, the enumeration; and updating the established NSEP service operation is performed for the one type of priority access service identified by the extracted enumeration.

17. The method of claim 14, wherein the second set of parameters comprises a set of Enhanced Distributed Channel Access (EDCA) or Priority Access parameters that are based on a traffic characteristic of the established NSEP service operation.

* * * * *